United States Patent [19]

Marchais

[11] Patent Number: 4,782,343
[45] Date of Patent: Nov. 1, 1988

[54] DEVICE FOR ELIMINATING FIXED ECHOES IN A RADAR

[75] Inventor: Jean Claude Marchais, Paris, France

[73] Assignee: Thomson-CSF, Paris, France

[21] Appl. No.: 964,376

[22] Filed: Nov. 22, 1978

[30] Foreign Application Priority Data

Dec. 16, 1987 [FR] France .......................... 7738093

[51] Int. Cl.⁴ .............................................. G01S 13/52
[52] U.S. Cl. ..................................... 342/160; 342/162
[58] Field of Search ................. 343/7.7; 342/160–163, 342/104, 115, 116, 28

[56] References Cited

U.S. PATENT DOCUMENTS

| | | | |
|---|---|---|---|
| 3,134,101 | 5/1964 | Dickey, Jr. ...................... | 342/163 |
| 3,166,746 | 1/1965 | Jacobson .......................... | 342/113 |
| 3,360,796 | 12/1967 | Rush ................................. | 342/160 |
| 3,388,394 | 6/1968 | Cappadona ...................... | 342/175 |
| 3,573,822 | 4/1971 | Kennedy .......................... | 342/175 |
| 3,614,784 | 10/1971 | Richmond ........................ | 342/160 |
| 3,680,096 | 7/1972 | Bosc ............................. | 342/162 X |
| 3,721,978 | 3/1973 | Daggett, Jr. ..................... | 342/102 |
| 3,742,500 | 6/1973 | Freedman ........................ | 342/102 |
| 3,745,571 | 7/1973 | Chwastyk et al. ............ | 342/162 X |
| 3,877,011 | 4/1975 | Holberg et al. ................. | 342/161 |

*Primary Examiner*—Thomas H. Tarcza
*Assistant Examiner*—John B. Sotomayor
*Attorney, Agent, or Firm*—Herbert Dubno

[57] ABSTRACT

A device for eliminating fixed echoes in a pulse radar. The device is provided with a demodulator unit where intermediate frequency signals of the radar are demodulated into video-frequency signals. The video-frequency signals are utilized in a utilizing unit provided with a display unit. A processing unit of the video-frequency signals is connected between the demodulator means and the utilizing unit. The processing unit is constituted with a range unit sampling circuit, a Doppler filtering unit and a video-frequency signal dynamic compressing unit connected in series. The processing unit is further provided with, on the one hand, a video-frequency signal amplitude measuring circuit for measuring at least the video amplitude signal in two range units in the same transmission recurrence and, on the other hand, with a dynamic compression control unit as a function of these amplitude, the video-frequency signal amplitude measuring circuit and the dynamic compression control unit being series connected upstream the Doppler filtering unit. w

11 Claims, No Drawings

DEVICE FOR ELIMINATING FIXED ECHOES IN A RADAR

The signals received by a radar include echoes from fixed targets and echoes from moving ones.

In a fixed radar station, the echoes of fixed targets produce zero or almost-zero Doppler frequencies. The echoes of moving targets, on the other hand, produce non-zero Doppler frequencies which are proportional to the radial velocity of these targets.

The elimination of fixed echoes is sought in order to show up the moving echoes in a display system for example. The elimination of fixed echoes is usually obtained by means of a Doppler filter which consists of a video-frequency signal pass-band filter. The filter pass-band is between the upper limit of the fixed echo spectrum and the lower limit of the image centred around the pulse repetition frequency of the fixed echo spectrum. The Doppler filter enables echoes with low Doppler frequencies or fixed echoes to be eliminated.

In present radars, in particular radars whose transmitter contains a magnetron, the level of fixed echo elimination in the radar is only of the order of 30 to 40 decibels. As the total dynamic of the signals is of the order of 60 decibels, the result is that the remains of high level fixed echoes are very big, up to 30 decibels. These remains interfere with the display of moving echoes. The radar elimination level is mainly limited by transmission noises, coherence noises, circuit imperfections and the signals' own spectrum. Also, certain fixed echoes are difficult to eliminate because of their spectrum part of which is transmitted by the Doppler filter. These echoes are, for example, cloud echoes, rain or foliage echoes and echoes offset in the beam.

Various solutions have been suggested for the elimination of these remains of fixed echoes.

The use of a base clipping circuit with a threshold requires a threshold value just above the amplitude of the fixed echo to be suppressed. This solution has the disadvantage of preventing the detection of many moving echoes at various distances from the fixed echo. The deliberate reduction of the threshold value causes an increase in the number of false alarms.

The use of a quantified gain device for several range channels results in the progressive attenuation of fixed echoes above a threshold value, taking into account the values of the highest amplitude echo. Each range channel has the same sensitivity, which is related to the highest amplitude of the echoes to the detriment of the weakest echoes. Also, quantified gain amplifier devices fitted in front of the Doppler filter introduce transient interference when switching occurs.

Another solution consists in using a system with adjustable dynamic compression which takes into account the amplitude of the video frequency signal in each range unit. This system does not allow the use of a contrast detector at the display device level, the control of the dynamic compression as a function of the video frequency signal amplitude upstream of the Doppler filter not allowing identity of processing by the contrast detector of the fixed echo remains located in a given range unit and of the radar thermal noise in a neighbouring unit.

FIG. 1a is an explanatory diagram showing, for the $n^{th}$ order range units of a given radar recurrence, levels of a fixed echo, whose maximum amplitude is 60 dB at 1 before Doppler filtering, the same fixed echo after Doppler filtering at 2, the fixed echo remains being at a level of 25 decibels, and the same fixed echo remains at 3 after an operation framing the level of these remains in a dynamic compression system. The dynamic of a system is defined as the ratio of the maximum to the minimum amplitude transmissible of a signal. For a display system, dynamic D is between the 0 and 10 dB levels. After the framing operation, the level of the fixed echo remains is less than the level of the radar thermal noise taken as a reference.

FIG. 1b shows the video frequency signal for the same fixed echo for the $n^{th}$ order range unit after operation of the framing aforementioned and after processing by the contrast detector and post-integration forming a constant false alarm rate system or "CFAR". It can be seen that, in accordance with FIG. 1b, a high level fixed echo, attenuated after Doppler filtering and framed below the radar noise level by the dynamic compression device has a contrast of maximum level after post-integration with respect to the adjacent range units. The $n^{th}$ order range unit fixed echo produces at the constant false alarm device output a high level of contrast which interferes with the means for using the video signal and will be displayed in the case in which these means include a display screen. The contrast between two adjacent range units is not retained then and the fixed echo remains at the output of a constant false alarm rate device supply a contrast which appears as an unsuppressed fixed echo.

One purpose of the present invention is the production of a device which eliminated fixed echoes but does not have the disadvantages described.

Another purpose of the present invention is the production of a device which eliminates fixed echoes with dynamic compression and which can be used in particular with a contrast detection device and a post-integration device or with a constant false alarm rate (CFAR) device.

The device in accordance with the invention contains, connected upstream the Doppler filter, means for measuring the amplitude or modulus of the video-frequency signal for several range units in the same recurrence. For each range unit, in accordance with the invention, a control of the video-frequency signal framing as a function of the relative amplitude of the various range units enables an elimination of the fixed echo remains to be obtained and the contrast of a range unit with respect to a neighbouring unit to be maintained.

The device complying with the invention can be used in any pulse radar system containing a device for eliminating fixed echoes by Doppler filtering.

The invention will be better understood by means of the description and drawings which follow in which, apart from FIGS. 1a and 1b showing graphs explaining the video-frequency signal processing in previous devices, FIG. 2 shows a block diagram of the device which is the subject of the invention;

FIG. 3 shows a detail of a particular embodiment of a circuit measuring the video-frequency signal modulus in the case of analog processing of the video-frequency signal in accordance with the purpose of the invention;

FIG. 4 shows another detail of an embodiment of a circuit selecting the video-frequency signal from neighbouring range units in the case of analog processing of the video-frequency signal in accordance with the purpose of the invention as shown in FIG. 2;

FIG. 5 shows a particular embodiment of a circuit measuring the video-frequency signal modulus in the case of digital processing of the video-frequency signal;

FIG. 6 shows a preferred embodiment of a circuit measuring the video-frequency signal modulus in accordance with the measuring circuit in the case of digital processing of the video-frequency signal as shown in FIG. 5;

FIG. 7 shows a preferred embodiment of a device, which is the subject of the invention, in accordance with the schematic diagram in FIG. 2 in which suppression of the fixed echo remains is obtained at the level of the video-frequency signal delivered to the utilisation circuit and in which contrast detection has no effect on the fixed echo remains whose level is lower than that of the radar thermal noise;

FIG. 8 shows a diagram comparing signals at different points in the schematic diagram as in FIG. 7.

In accordance with FIG. 2 the fixed echo elimination device in a pulse radar containing, on reception, means 1 for demodulating intermediate frequency signals to video-frequency signals and means 2 for utilising them includes, connected between the demodulation means 1 and the utilising means 2, means 3 for processing the video-frequency containing means for sampling the video-frequency signal into range units, Doppler filtering means and means for compressing the dynamic of the video-frequency signal which enable the video-frequency signal amplitude to be adapted to the characteristics of the utilising circuit dynamic. In accordance with FIG. 2, the intermediate frequency signal Σ and a signal jΣ, which with respect to the intermediate frequency signal Σ is out of phase by $\pi/2$, feed respectively two amplitude phase detectors 100 and 101. Amplitude phase detectors 100 and 101 each receive a demodulation reference wave delivered by a reference generator 102. Amplitude phase detectors 100 and 101 demodulate signals Σ and jΣ at the intermediate frequency to video-frequency signals.

The detector output signals at video-frequency are each applied to a matched filter 103, 104. Video-frequency signals Σ and jΣ after filtering are delivered to sampling means into range units formed by fast sampler cut-offs 31a and 31b. Each sampler 31a and 31b receives signals from clock H delivered by radar synchronising circuits, which are not shown, and control sampling of video-frequency signals Σ and jΣ into a large number of range units of length τ for each radar transmission recurrence. As a non-limiting example, τ is 0.5 μ/sec.

The device contains, series connected with sampler 31a, Doppler filtering means 32 and dynamic compression means 33 on the one hand and, series connected upstream the Doppler filtering means, means 34 for measuring the amplitude of video-frequency signals for at least two range units in the same transmission recurrence and means 35 for controlling the dynamic compression means as a functon of these amplitudes on the other. The dynamic compression means deliver the video-frequency signal to utilising means 2.

Dynamic compression means 33, as a non-limiting example in the case of analog processing of the video-frequency signal, are formed by an adjustable quantified gain amplifier or by an amplifier connected in cascade with a base clipping circuit with a threshold. Utilising means 2 include a display screen for example. Control of dynamic compression means 33 is obtained through a delay circuit, which is not shown, enabling the delay due to measurement and control to be compensated for.

The device shown in FIG. 2 operates as follows:

After sampling of video-frequency signals Σ and jΣ, Doppler filtering means 32 deliver the video-frequency signal, which only contains the fixed echo remains because of the Doppler filtering, to dynamic compression means 33. Video-frequency signal amplitude measuring means 34 enable a comparative measurement to be made, for each of the range units defined in each transmission recurrence, of the video-frequency signal modulus with respect to the modulus of this same video-frequency signal in at least one range unit neighbouring a given range unit. Video-frequency signal modulus measurement means 34 deliver a control signal to dynamic compression means 33 enabling the gain of the adjustable quantified gain amplifier or the threshold value of the base clipper with a threshold forming dynamic compression means 33 to be adjusted, taking into account the relative value of the video-frequency signal amplitude in a range unit with respect to the amplitude of this signal in a neighbouring range unit. The relative contrast between two neighbouring range units is thus retained at the level of the means using the video-frequency signal.

As a non-limiting example, the video-frequency signal dynamic compression is defined by the following operation:

TABLE I

| Level of the video-frequency signal Σ before dynamic compression | Variation in gain ΔG of the dynamic compression or framing means |
| --- | --- |
| 0 to 30 dB | 0 dB |
| 30 to 36 dB | −6 dB |
| 36 to 42 dB | −12 dB |
| 42 to 48 dB | −18 dB |
| 48 to 54 dB | −24 dB |
| 54 to 60 dB | −30 dB |

As an example, a comparative table II shows that, in the case of dynamic compression by control from the video-frequency signal amplitude in a single range unit, the relative contrast between couples of adjacent range units is greatly altered with respect to the relative contrast before dynamic compression. On the other hand, this same relative contrast is retained when, in accordance with the purpose of the invention, the dynamic compression control is obtained from the relative amplitude of the video-frequency signal in a given range unit with respect to the video-frequency signal amplitude in one or more neighbouring range units.

In a non-limiting embodiment of the invention, the adjustment of gain ΔG is determined, for two adjacent range units, by the signal with the highest amplitude determining, at the level of the dynamic compression means, the variations in gain ΔG given in the table above. When the relative contrast between two adjacent range units is defined as the difference in level in decibels between the video-frequency signals in the $n^{th}$ order range unit and the video-frequency signals in an adjacent range unit of the order immediately above, the $n^{th}+1$ for example, table II gives as a non-limiting example video-frequency signal levels for range units n−2, n−1, n, n+1 and n+2 in which the values of the video-frequency signal amplitudes are respectively 0 dB, 29 dB, 55 dB, 40 dB and 0 dB. The framing or gain variation applied to the dynamic compression means is given in accordance with table I above, on the one hand in the case of framing by an independent range unit in table II and on the other in the case of framing for each range unit allowing for the relative value of the video-frequency signal amplitude with respect to the video-frequency signal amplitude in an adjacent range unit in table III.

TABLE II

| Range unit order | Video signal amplitude | Framing by independant range unit ΔG | Relative contrast before framing | Relative contrast after framing |
|---|---|---|---|---|
| n − 2 | 0 dB | 0 dB | 29 dB | 29 dB |
| n − 1 | 29 dB | 0 dB | 26 dB | −4 dB |
| n | 55 dB | −30 dB | −15 dB | +3 dB |
| n + 1 | 40 dB | −12 dB | −40 dB | −28 dB |
| n + 2 | 0 dB | 0 dB | | |

TABLE III

| Range unit order | Video signal amplitude | Relative value Framing ΔG | Relative contrast before framing | Relative contrast after framing |
|---|---|---|---|---|
| n − 2 | 0 dB | 0 dB | 29 dB | 29 dB |
| n − 1 | 29 dB | −30 dB | 26 dB | 26 dB |
| n | 55 dB | −30 dB | −15 dB | −15 dB |
| n + 1 | 40 dB | −12 dB | −40 dB | −40 dB |
| n + 2 | 0 dB | | | |

In accordance with the preceding example, it may be seen that, in the case of framing by an independent range unit, the relative contrast of the video-frequency signal is greatly altered with respect to the relative contrast of video-frequency signals before dynamic compression whereas in the case of framing in accordance with the device, which is the subject of the invention, from table III, the relative contrast is mainly retained.

The framing or gain adjustment of the dynamic compression means is not outside the scope of the present invention when the relative value of the video-frequency signal amplitude in a range unit with respect to the video-frequency signal amplitude of this same signal in several adjacent range units or units near to the range unit being considered or with respect to the amplitude of a linear combination of the video-frequency signal amplitudes in these adjacent range units or units near to each $n^{th}$ order range unit is taken into account, as optimizing of the relative contrast between adjacent range units is thus obtained.

In the particular embodiment of the circuit in FIG. 3 in the case of analog processing the video-frequency signal, means 34 for measuring the modulus of video-frequency signal Σ, which are fed with signals Σ and jΣ delivered, for example, by sampler cut-offs 31a and 31b, contain a weighting operator 341 and a sign logic circuit 342. From the analog data Σ and jΣ, which are sampled and recorded, the operator delivers the eight data ±σ1, ±σ2, ±σ3, ±σ4, in which σ1, σ2, σ3 and σ4 represent respectively the quantities σ1=(0.41Σ+jΣ), σ2=(Σ+0.41jΣ), σ3=(Σ−0.41 jΣ) and σ4=(0.41Σ−jΣ).

The sign logic circuit of signals Σ+jΣ, Σ−jΣ, jΣ and Σ, from the signs of these signals, makes possible the control of analog multiplexer 343 which is fed with signals ±σ1, ±σ2, ±σ3 and ±σ4. Analog multiplexer 343 delivers a signal representing the modulus of video-frequency signal Σ. The video-frequency signal modulus for each range unit is delivered by analog multiplexer 343 to auxiliary memory 344 piloted by the sampling control signals in range unit H which are produced by the radar synchronizing circuits. Auxiliary memory 344 delivers signals Σn, Σn−p and Σn+p for each recurrence with a delay recurrence with respect to the transmission recurrence considered for example. These signals represent the video-frequency signal modulus of the $n^{th}$ order range unit and of the adjacent or neighbouring range units respectively. Auxiliary memory 344 is formed by a charge transfer register for example.

Signals Σn, Σn−p, and Σn+p are delivered to means 35 controlling the dynamic compression means.

The accordance with FIG. 4, as a non-limiting example, control means 35 contain a differential amplifier 351 whose inputs in the difference mode are fed respectively with video-frequency signal Σn from the $n^{th}$ order range unit and with a video-frequency reference signal $\overline{\Sigma}$ representing a weighted linear combination of the amplitudes of video-frequency signals Σn−p and Σn+p from the units adjacent to or near each $n^{th}$ order unit. Signal $\overline{\Sigma}$ is delivered by computer 350 which is either making a first comparison between the levels of video-frequency signals Σn−p and Σn+p and delivering the signal Σn−p or Σn+p with the greater amplitude or calculating a weighted mean of the values of these signals. Differential amplifier 351 pilots a bistable flip-flop 352 which makes it possible to control switches 353 and 354 from complemented outputs Q and $\overline{Q}$. Switches 353 and 354 are formed by field effect transistors for example. Switches 353 and 354, when fed with signals Σn and $\overline{\Sigma}$ enable the signal Σn or $\overline{\Sigma}$ withe the greater amplitude to be transmitted to dynamic compression means 33. The reading of auxiliary memory 344 at the sampling rate in the range units makes possible the corresponding retention of the variation in gain ΔG of the dynamic compression means during the length τ of each range unit.

In accordance with a particular way of making a circuit related to digital processing of the video-frequency signal as in FIG. 5, the means for measuring the video-frequency signal modulus contain an analog-digital converter 341 and 342 for each video-frequency signal Σ and jΣ. Analog-digital converter 341 delivers video-frequency signals Σ in digital form to Doppler filtering means 32. In this case, Doppler filtering means 32 are formed by a digital Doppler filter. Such digital filters are known to professionals. As an example, they may be formed by a digital filter known under the name of "double cancellation filter" in the digital filtering technique. Any digital filtering device using simple or multiple cancellations or using different digital filtering techniques depending on the size of the filter required is within the framework of the present invention. In accordance with the particular embodiment of the invention shown in FIG. 5, the means for measuring the modulus of video-frequency signal Σ also contain transcoding device 343. Transcoding device 343 receives in digital form the data concerning the video-frequency signal Σ and jΣ from converters 341 and 342 and delivers data M, in digital form, concerning the video-frequency signal modulus. The transcoding device is formed, for example, by a ROM addressed by the digital data delivered by analog-digital converters 341 and 342 respectively.

In the case in which the radar transmission recurrence frequency is much higher than the Doppler frequencies and the frequencies of the ground and target echo spectrum, the case of targets moving at a very slow radial velocity with respect to the radar, the video-frequency signal modulus measurement is made from the video-frequency signal $\Sigma$ or $j\Sigma$ only, the only channel used in Doppler processing. The dynamic compression control is then obtained in the same way from the video-frequency signal modulus measurement.

Analog-digital converters 341 and 342 are preferably analog-digital converters which enable the whole dynamic of the video-frequency signal delivered by the amplitude phase detectors, i.e. a 60 dB dynamic, to be processed for each range unit and which require a capacity for converting the corresponding data into 10 digital data bits plus a sign bit.

FIG. 6 shows a preferred embodiment of an analog-digital converter with the required performance. The analog-digital converter shown in FIG. 6 can be used in the operating conditions of an acquisition radar in which the video-frequency signal modulus to be converted changes slowly from one transmission recurrence to the next with respect to the same variation of the video-frequency signal modulus at the conversion frequency, the relative variation being up to a ratio of 1 to 500 for example.

In accordance with FIG. 6, the means for measuring the modulus of video-frequency signals $\Sigma$ and $j\Sigma$ include in cascade in each channel $\Sigma$ and $j\Sigma$ respectively an adjustable gain analog attenuator, 3410 and 3420, fed by sampler cut-offs 31a and 31b respectively, an analog-digital converter, 3411 and 3421, and an adjustable gain digital attenuator, 3412 and 3422. Each analog-digital converter is a converter with a standard capacity of 7 bits plus a sign bit. Each digital attenuator addresses transcoding device 343, which has already been defined. Transcoding device 343 delivers the video-frequency signal modulus M in digital form. This signal is also used to control the attenuation in digital attenuators 3412 and 3422 and analog attenuators 3410 and 3420. The digital attenuator is formed by a binary attenuator by bit shifting for example. The logic attenuators are formed by adjustable gain amplifiers. The gain control in the adjustable gain amplifiers is obtained from digital signal M which represents the video-frequency signal modulus. Control of the analog attenuator is obtained directly from the digital signals. Attenuation control in the analog and digital attenuators is obtained through delay circuit 3413 which introduces a delay equal to a radar transmission recurrence. Hence, the time taken to pass through the analog digital converters has no effect. The modulus of the signals measured in each range unit for a given recurrence is used to centre the analog digital conversion range.

Transcoding means 343 contain an auxiliary memory which enables data to be stored relative to the signal amplitude in two range units of the same recurrence in accordance with a non-limiting embodiment of the circuit which is the subject of the invention. The auxiliary memory delivers data concerning the amplitude of the range units to control means 35 which include means for selecting the signal with the greatest amplitude. These selection means are formed, for example, by a logic circuit which makes possible detection and transmission in digital form of the signal containing the highest order data bit in the case of conversion to binary digital data.

Dynamic compression means 33, in the case in which the device, which is the subject of the invention, is made as shown in FIG. 6, are formed by a binary attenuator, suppression of a bit in the data transmitted corresponding to an attenuation proportional to the order of the bit suppressed. The device shown in FIG. 6 operates as follows:

The analog and digital attenuators function simultaneously but in opposite directions, i.e. any attenuation by 2, 4, 8 and 16 in the logic attenuator is compensated for by a digital shift of 1, 2, 3 or 4 bits. Because of this the analog-digital converter capacity of 7 bits plus a sign bit is extended to a capacity of 11 bits plus a sign bit for the conversion dynamic. The resolution and linearly of the order of 1/100 in the conversion device is thus retained and allows processing later by Doppler filtering of the video-frequency signal and control of the framing by control of the dynamic compression means by signal M.

In accordance with a preferred embodiment the circuit which is the subject of the invention as shown in FIG. 7, the means for processing the video-frequency signal also contain means 36 for producing a noise signal of the same level for each $n^{th}$ range unit considered and for the adjacent range units when means 2 for using the video-frequency signal include a contrast detector. A post-integration system combined with the contrast detector just mentioned produces, as already stated, the maximum contrast level for the $n^{th}$ order range unit whose video-frequency signal level, which is formed by the remains of a fixed echo, is less than the radar noise level. The addition of a noise signal in front of the contrast detector of display means 2, without noticeably degrading the radar visibility factor, enables the fixed echo remains to be masked. The noise signal which is added for all range units is a gaussian noise whose mean value is zero. The noise signal has the same level in each of the range units near the $n^{th}$ order range unit and in the $n^{th}$ order unit but is independent from one unit to another. The noise level injected is sufficient to mask the fixed echo remains but is as small as possible in order not to degrade noticeably the radar visibility factor.

FIG. 8 shows in 8a, 8b, 8c, 8d and 8e the signals picked up respectively at (a) the matched filter output, (b) the Doppler filter output, (c) the contrast detector output after post-integration without the addition of a noise signal, (d) the Doppler filter output (e) the contrast detector output with the addition of noise respectively in the case of fixed echo A only and in the case of fixed echo A on which is superimposed moving echo B. At the contrast detector output after post-integration in FIG. 8e, the contrast is at a maximum in the case of a moving echo superimposed on the fixed echo whereas the contrast is analogous in FIG. 8c in the case of fixed echo A only because of the existence, as such, of the fixed echo remains detected by the contrast detector.

In fact the noise signal is added in each range unit as sequential processing of the video-frequency signal is done for each range unit.

In the case in which the relative amplitude of the video-frequency signals is measured in two adjacent range units in accordance with a non-limiting way of making the circuit which is the subject of the invention, the means for producing the noise signal contain two decorrelated noise generators which deliver a noise signal for the even order range units and odd order range units respectively.

The two noise generators may be replaced by independent noise samples recorded in the memory, in digital form for example, and used sequentially or pseudo-randomly.

The invention is applicable to pulse radars such as acquisition radars in particular, tracking radars and acquisition and tracking radars, the signal processing method being the same for a smaller number of range units only covering a smaller area.

The device is also applicable to systems tracking discontinuous data.

What we claim is:

1. A device for eliminating fixed echoes in a pulse radar containing, on reception, means for demodulating intermediate frequency signals to video-frequency signals, means for utilizing the video-frequency signals and means for processing the video-frequency signals connected between the demodulator means and the utilising means, processing means including, connected in series, range unit sampling means, Doppler filtering means and means for compressing the video-frequency signal dynamic, wherein said device also contains, series connected upstream the Doppler filtering means, means for measuring the video-frequency signal amplitude for at least two range units in the same transmission recurrence and means for controlling the dynamic compression means as a function of these amplitudes.

2. A device for eliminating fixed echoes in a pulse radar as in claim 1, wherein said means for controlling the dynamic compression means include:

means for computing a video-frequency frequence signal $\overline{\Sigma}$ representing a weighted linear combination of the video-frequency signal amplitudes in neighbouring range units for each $n^{th}$ order range unit;

means for selecting, for each $n^{th}$ order range unit, the greatest amplitude video-frequency signal with respect to the video-frequency reference signal $\overline{\Sigma}$.

3. A device for eliminating fixed echoes in a pulse radar as in claim 2, wherein said means for controlling the dynamic compression include means for comparing, for each $n^{th}$ order range unit, the $n^{th}$ order unit video-frequency signal amplitude and that of a range unit adjacent to said $n^{th}$ order range unit and means for selecting the greater amplitude video-frequency signal.

4. A device for eliminating fixed echoes in a pulse radar as in claim 1, wherein the dynamic compression means are formed by an adjustable quantified gain amplifier.

5. A device for eliminating fixed echoes in a pulse radar as in claim 1, wherein said means for measuring the video-frequency amplitude include analog-digital conversion means which deliver data concerning the video-frequency signal amplitude in digital form.

6. A device for eliminating fixed echoes in a pulse radar as in claim 5, wherein said measuring means include transcoding means containing a programmed ROM which receives the data concerning the video-frequency signal amplitude in digital form and delivers the data concerning the video-frequency signal modulus directly.

7. A device for eliminating fixed echoes in a radar as in claim 5, wherein said measuring means contain in cascade in each channel of the video-frequency signals $\Sigma$ and $j\Sigma$ an analog attenuator, an analog-digital converter and an adjustable gain digital attenuator, the analog and digital attenuators receiving at a control input data concerning the amplitude of signals delivered by the transcoding means.

8. A device for eliminating fixed echoes in a pulse radar as in claim 7, wherein said transcoding means include a programmed ROM and an auxiliary memory enabling data concerning the signal amplitude in two range units of the same recurrence to be stored, said auxiliary memory delivering data concerning the signal amplitude in the said range units to means for selecting the greater amplitude signal.

9. A device for eliminating fixed echoes in a pulse radar as in claim 8, wherein said means for selecting and controlling the dynamic compression means include a delay circuit enabling the delay due to the measurement and control to be compensated for.

10. A device for eliminating fixed echoes in a pulse radar as in claim 1, wherein said means for using the video-frequency signals include a contrast detector, the said device also including upstream said contrast detector, means for producing noise signals of the same level in each range unit, the same noise signals being independent and decorrelated for the range units in the same recurrence for which the measurement of amplitude is made.

11. A device for eliminating fixed echoes in a pulse radar as in claim 9, wherein, in the case in which the signal amplitude in two adjacent range units is measured, the said means of producing noise signals contain two noise generators delivering noise signals for even order range units and odd order range units respectively.

* * * * *